United States Patent [19]

Shimizu et al.

[11] Patent Number: 5,302,556
[45] Date of Patent: Apr. 12, 1994

[54] SYNTHETIC SILICA GLASS ARTICLES AND A METHOD FOR MANUFACTURING THEM

[75] Inventors: Takaaki Shimizu; Masatoshi Takita, both of Joetsu, Japan

[73] Assignee: Shin-Etsu Chemical Co., Ltd., Tokyo, Japan

[21] Appl. No.: 862,799

[22] Filed: Apr. 3, 1992

Related U.S. Application Data

[62] Division of Ser. No. 485,954, Feb. 27, 1990, Pat. No. 5,141,786.

[30] Foreign Application Priority Data

Feb. 28, 1989 [JP] Japan .................. 1-048060
Sep. 4, 1989 [JP] Japan .................. 1-228907

[51] Int. Cl.$^5$ ............................. C03C 3/06
[52] U.S. Cl. ........................ 501/12; 501/54
[58] Field of Search ...................... 501/54, 12

[56] References Cited

U.S. PATENT DOCUMENTS 4,243,422 1/1981 Lenz et al. .................. 501/54
4,747,863 5/1988 Clasen et al. ................ 501/12
4,798,681 1/1989 Oversluizen et al. ......... 501/54

FOREIGN PATENT DOCUMENTS 310748 12/1988 Japan .................. C03C 3/06

Primary Examiner—Mark L. Bell
Assistant Examiner—C. M. Bonner
Attorney, Agent, or Firm—McAulay Fisher Nissen Goldberg & Kiel

[57] ABSTRACT

A synthetic silica glass article made by hydrolyzing an alkoxysilane and thermally sintering the resulting silica; this synthetic silica glass article has a viscosity of not lower than $10^{10}$ poise at 1400° C., and contains, as metallic impurities, less than 1 ppm of Al, less than 0.2 ppm of Fe, less than 0.2 ppm of Na, less than 0.2 ppm of K, less than 0.01 ppm of Li, less than 0.2 ppm of Ca, less than 0.02 ppm of Ti, less than 0.01 ppm of B, less than 0.01 ppm of P, less than 0.01 ppm of As.

5 Claims, No Drawings

SYNTHETIC SILICA GLASS ARTICLES AND A METHOD FOR MANUFACTURING THEM

This is a division of application Ser. No. 07/485,954, filed Feb. 27, 1990 now U.S. Pat. No. 5,141,786 issued Aug. 25, 1992.

BACKGROUND OF THE INVENTION

1. Field of the Invention

The present invention relates to synthetic silica glass articles and a method for manufacturing them. More particularly, it relates to synthetic silica glass articles, such as, crucibles, containing decreased amounts of metallic impurities and capable of exhibiting high viscosity at high temperatures as high as or even higher than the viscosity of natural quartz glass at such high temperatures. The inventive glass makes excellent melting crucibles for use in a Czochralski-method semiconductor (silicon) single crystal ingot pulling apparatus, or as heat resistant materials used in a diffusion furnace.

2. Description of the Prior Art

Silicon single crystal ingot is manufactured in any of the following methods: the floating zone method (FZ method) wherein a polycrystal silicon ingot obtained by thermally decomposing trichlorosilane is single-crystalized by heating with a high frequency wave; the Czochralski method (CZ method) wherein the same polycrystal silicon is melted in a quartz crucible, a seed crystal is dipped in the melt, and a single crystal is pulled up from the melt; and the magnetic-field applied Czochralski method (MCZ method) which is a special Czochralski method wherein a magnetic field is applied to the melt. Among these methods, the FZ method gives a silicon single crystal of the highest purity since with the other two methods, the quartz crucible holding the silicon melt contains small amounts of impurities, such as, Al and B, which elute into and thereby contaminate the melt. When thus contaminated, the resulting semiconductor material will have a resistance which is lower than expected. The lower portion of the single crystal silicon ingot, which is grown toward the end of the crystallization, tends to have a greater concentration of the impurities. Since the concentration determines the segregation coefficient of the impurities, the resulting single crystal silicon ingot will have nonuniformities in properties in both the axial direction and radial direction, so that the reliability of the product will be poor and quality control becomes difficult.

The contamination of the silicon single crystal occurs not only during the pulling up operation, but also during the diffusion operation. For example, in diffusing boron and phosphorus throughout the silicon wafer, the wafer is heated to about 1000° C. in a furnace. During this procedure, transition metals and alkali metals, such as, iron, copper, sodium, potassium, and lithium eluting from a silica glass furnace tube and other jigs, contaminate the silicon wafer. Consequently, elemental devices incorporating the chips made from the wafer will have increased noise and poor performance properties. Therefore, in order to solve the contamination problem, it is necessary to decrease the concentration of all of the elements regarded as diffusible impurities.

The crucibles used in single crystal pulling apparatus, and especially those used in silicon single crystal pulling apparatuses, are commonly made from natural quartz glass due to its excellent heat-resisting property. However, natural quartz glass contains a relatively large amount of impurities and the resulting contamination of the single crystal ingots is a serious problem. The tendency towards higher integration of semiconductor memories has increased the demand for single crystal semiconductors of higher purity. This has resulted in an increased occurrence of out-of-specification wafers.

Japanese Provisional Patent Publication (Kokai) No. 59-129421 (1984) proposes a method wherein a quartz glass crucible containing no more than 0.5 ppm of alkali metals and no more than 0.03 ppm of copper, and having a viscosity at 1200° C. of not lower than $10^{12}$ poise, is obtained by refining a natural quartz crystal through flotation, steeping the crystal in hydrogen fluoride liquid, melting the crystal for many hours to evaporate alkali metals and copper, and casting it in the shape of a crucible. Further to this, Japanese Provisional Patent Publication (Kokai) No. 60-137892 (1985) proposes a method wherein a quartz glass crucible containing no more than 0.2 ppm of alkali metals and no more than 0.02 ppm of copper, having a viscosity at 1450° C. of $10^{10}$ poise, and an electrical resistance at 1200° C. of not lower than $1.4 \times 10^7$ Ω.m, is obtained by refining a natural quartz crystal through flotation, arc-melting the crystal, casting it in the shape of a crucible, and conducting a direct current of 10 kV through the crystal under a temperature of 1300° C. in a furnace to thereby move and remove the alkali metals and copper.

Japanese Provisional Patent Publication (Kokai) No. 61-44793 (1986) teaches a quartz glass crucible wherein the inner layer has an OH group content of no less than 200 ppm and a viscosity at 1400° C. of $10^8$–$10^9$ poise, and the outer layer has an OH group content of no more than 100 ppm and a viscosity at 1400° C. of not lower than $10^{10}$ poise. The quartz glass crucible obtained is capable of allowing the silicon crystal ingot to contain a large number of oxygen atoms which function to adsorb and remove impurities, such as, heavy metals and microdefections existing in the surface areas of wafers sliced from the ingot.

The quartz glass crucibles disclosed by Japanese Provisional Patent Publication (Kokai) No. 59-129421 and Japanese Provisional Patent Publication (Kokai) No. 60-137892 both originate from natural quartz, and to decrease the contents of alkali metals and copper in natural quartz, the methods employ either extended melting periods or electrolysis. However, metallic elements, such as, Al, Ti, Zr, B, and P which exist in considerable amounts in the natural quartz cannot be removed owing to their low diffusion rates. These metallic impurities need be removed since the silicon single crystal contaminated with them will have poor semiconductor properties.

Also, studies have been carried on to develop methods for making a crucible of high purity synthetic silica glass. An example of such methods is to hydrolyze silicon tetrachloride or the like in an oxyhydrogen flame to thereby obtain silica grains. After melting the silica grains, the resulting quartz glass is cast in the shape of a crucible. However, a problem with this method is that since as much as 1000 ppm of OH groups are retained in the glass, the viscosity becomes excessively low at high temperatures, and, in the vacuum atmosphere, the glass foams at high temperatures. Another example of such methods employs a plasma jet flame in place of the oxyhydrogen flame. However a problem is that the cost is high and it is difficult to operate the method on a mass production basis. Also, the so-called sol-gel method is known wherein an alkoxysilane is hydrolyzed in alcoholic solvent to obtain silica, which is then melted to form a synthetic silica glass. However, with this method, although it is possible to obtain high purity material at a relatively low cost, it is disadvantageous because the tendency to retain OH groups is excessive, and because a relatively long time is required for the manufacturing, and also it is not easy to obtain silica glass which maintains a high viscosity at high temperatures.

SUMMARY OF THE INVENTION

The inventors have discovered a method for manufacturing high-purity synthetic silica glass article. In particular, the inventors have found that, while there is no particular relation between the OH group content and the viscosity in the case of the natural quartz glass, a strong relation exists between these properties in the case of synthetic silica glass. Specifically, when the content of OH group is reduced, the viscosity at high temperatures becomes higher. More particularly, they found that if the content of the OH groups is not greater than 300 ppm, it is possible to maintain the viscosity of the synthetic silica glass at 1400° C. at not lower than $10^{10}$ poise and also to curb the foaming phenomenon which causes dislocations in a single crystal silicon ingot during the crystal pulling operation.

The inventors have also discovered a method to obtain such synthetic silica glass using the sol-gel method wherein an alkoxysilane is hydrolyzed in the presence of a strong base, the silica therefrom is sintered at temperatures not lower than 1700° C., or preferably not lower than 1850° C., and after pulverizing, the water adsorbed on the glass powder is removed to an amount of less than 0.05 weight percent, or preferably 0.03 weight percent, and the glass powder is then melted by heat and molded.

Also, the inventors found that the inventive synthetic silica glass article obtained by hydrolyzing an alkoxysilane in the presence of a strong base, such as, ammonia, and thermally sintering the resulting silica, has a high purity; namely it contains less than 1 ppm of Al, less than 0.2 ppm of Fe, Na, K, Ca, respectively, and less than 0.01 ppm of Li, B, P, As, respectively, and has a viscosity at 1400° C. of not lower than $10^{10}$ poise.

Also, the synthetic silica glass articles thus made contain no more than 300 ppm of OH group.

Inventive synthetic silica glass articles described above can be obtained by a method comprising the steps of: (a) obtaining silica by hydrolyzing an alkoxysilane in the presence of ammonia; (b) separating the silica from the hydrolysis medium; (c) heating the silica to 1000° C. to thereby remove water, solvent, and carbon; (d) sintering the silica at temperatures not lower than 1500° C.; (e) pulverizing and sieving the sintered silica to thereby obtain synthetic silica glass powder; (f) treating the silica glass powder with an acid, washing the same with water, and drying the same; and (g) thermally sintering and shaping the silica glass powder.

Preferably, the alkoxysilane is methoxysilane.

More preferably, in the step (g) above the water adsorbed on the synthetic silica glass is present in an amount of not greater than 0.05 weight percent.

DETAILED DESCRIPTION OF THE INVENTION

As described above, the synthetic silica glass articles of the invention are made by hydrolyzing an alkoxysilane in the presence of a strong base, thermally sintering the resulting silica to obtain a silica glass, and sintering and shaping it. The alkoxysilane may be tetramethoxysilane, tetraethoxysilane, tetrapropoxysilane, tetrabutoxysilane, methoxytriethoxisilane, dimethoxydiethoxysilane, trimethoxyethoxysilane, or the like. But tetramethoxysilane and tetraethoxysilane are preferred for their high hydrolysis reactivity, availability, and low costs.

To effect hydrolysis of an alkoxysilane, the alkoxysilane is sufficiently purified by distillation and dripped into a strong basic solution which is prepared, for example, by adding 29-wt % aqueous ammonia to distilled water and kept at an optimum temperature. If this hydrolysis is conducted in a neutral or acidic solution, the resulting silica glass will have a low viscosity at high temperatures, so that the catalytic solution for the hydrolysis ought to be strongly basic.

As the hydrolysis proceeds, the alkoxysilane forms into globular grains. The grains are heated to a temperature between 300° and 1000° C. in air to be decarburized, and then sintered at temperatures from 1500° to 2000° C. whereby silica glass is obtained.

Since the starting alkoxysilane is well purified, the resulting silica glass has a high purity: for example, less than 1 ppm of Al; less than 0.2 ppm, respectively, of Fe, Na, K, Ca; less than 0.02 ppm of Ti; and less than 0.01 ppm, respectively, of Li, B, P, As. Also, the viscosity of the silica glass at 1400° C. is not lower than $10^{10}$ poise.

Also, the content of OH group in the synthetic silica glass of the invention is no more than 300 ppm and the viscosity at 1400° C. is not lower than $10^{10}$ poise.

Generally, the viscosity of conventional synthetic silica glass at high temperatures is so low that it has been thought that crucibles made of synthetic silica glass cannot be used in the single crystal growing operation which is conducted at temperatures about 1500° C. The inventors, searching into the difference between the natural quartz glass and the synthetic silica glass in terms of the moisture adsorbed on the powder, the OH group content, and the viscosity at high temperatures, found that the natural quartz glass made from natural quartz crystal, quartz sand, etc. and α-quartz is constructed of a regular crystal so that virtually no OH group exists in the crystal lattice of α-quartz, and that the only OH groups that exist in α-quartz exist only in the form of $H_2O$ in the bubbles and glass. Therefore, the OH group content of the natural quartz glass is very low, and the correlation exists between the high temperature viscosity and the OH group content.

Incidentally, the OH group content of a glass is strongly influenced by the amount of water adsorbed on the glass particles as well as the atmosphere in which the melting is conducted. The viscosity of the glass is profoundly affected by this OH group content, and a glass will deform at high temperatures if its viscosity is low at the temperatures. If a crucible for use in a single crystal ingot pulling apparatus has a high OH group content, the expansion coefficient becomes greater and the foams in the crucible tend to explode, especially under a reduced pressure, whereby a desirable ingot pulling up operation may not be attained. The critical OH group content is 300 ppm, above which the probability of foam explosion sharply increases. Accordingly, the amount of water adsorbed on the glass should not exceed 0.06 wt %. It is postulated that if the OH group content is less than 300 ppm the OH groups tend to exist in —SiOH groups while if the content exceeds 300 ppm they tend to exist in $H_2O$ which tends to form water foams in the glass.

Also, in the case of synthetic silica glass, it is assumed that, when heated by the arc flame during the formation of the crucible, the ≡Si—Si≡ group in the glass reacts with the adsorbed water to produce ≡SiOH group whose binding strength is weaker, and as the amount of the ≡SiOH group increases the high temperature viscosity also decreases. And in reality, it is observed that there exists a strong correlation between the OH group content and the high temperature viscosity.

It follows therefore that if the synthetic silica glass crucible contains no more than 300 ppm of OH group the viscosity at 1400° C. will not be lower than $10^{10}$ poise. Crucibles made of such synthetic silica glass is useful as melting crucibles for growing silicon semiconductor single crystal.

Also, the water and OH groups contained in such crucibles tend to foam during pulling operation of a silicon single crystal ingot and thereby contribute to the development of dislocation in the single crystal.

In order to make a synthetic silica glass crucible from a silica obtained by the sol-gel method, in which an alkoxysilane is hydrolyzed in the presence of a strong base, the following steps are taken: (a) sintering the silica obtained by the sol-gel method; (b) pulverizing the thus sintered silica; (c) melting the silica by means of arc flame; (d) and shaping it. Since no more than 300 ppm of OH group is to be contained in the synthetic silica glass, the sintering operation is conducted at a temperature not lower than 1700° C., or preferably not lower than 1850° C. It is, therefore, possible to obtain silica glass particles containing less than 300 ppm of OH groups from the thus obtained sintered silica glass ingots.

The atmosphere for the sintering can be either a vacuum, air, or an inert gas, such as, helium. If transparency is desired in the resulting article of the silica glass, a vacuum atmosphere should be adopted.

The sintered mass of the silica particles is then crushed and pulverized in a suitable pulverizing machine, such as, ball mills, roller mills, rod mills and the like into a powder having a particle size distribution sufficient to pass a 50 mesh screen, but to be retained on a 200 mesh screen in the Tyler standard of sieves. The thus obtained silica powder is subjected to a cleaning treatment by washing with a dilute acid, such as, hydrochloric and/or hydrofluoric acids followed by thorough washing with pure water and drying.

The desired synthetic silica glass crucible can be obtained by melting and sintering the synthetic silica glass powder with an arc flame and molding it into a crucible. However, since the ≡Si—Si≡ group contained in the synthetic silica glass reacts with the moisture adsorbed on the synthetic silica glass powder during the melting by the arc flame to produce ≡SiOH group, if the amount of the moisture adsorbed on the powder is considerable, the occurrence of the ≡SiOH group becomes so much that the OH group content may exceed 300 ppm. Therefore, it is very important to strictly control the amount of adsorbed water in the synthetic silica glass powder to keep the OH content less than about 300 ppm. It is therefore necessary to restrict the amount of the adsorbed water to less than 0.05 weight percent, or preferably less than 0.03 weight percent, as measured by the Karl Fischer method. If the amount of the adsorbed water is thus restricted, the OH group content will not exceed 300 ppm, the silica glass article thus produced will have a low expansion coefficient, and a crucible made of the silica glass will not foam when it is used in a silicon single crystal ingot pulling apparatus. Incidentally, from the viewpoint of the OH group content, the less the absorbed water amount, the better; but too little water facilitates the generation of static electricity, which renders it difficult to mold with precision. In this event, the powder should be neutralized with an ionizer.

EXAMPLES

Example 1

In a 500-liter Pyrex glass flask, 150 liters of 29 wt % $NH_4OH$ and 50 liters of super pure water were poured and cooled to 0° C., and 265 liters of tetramethoxysilane purified by distillation were added to be hydrolyzed. The resulting silica was collected by a centrifugal dehydrator, heated to 1200° C. for 20 hours in the air, and sintered by raising the temperature to 1700° C. for six hours.

The sintered silica was pulverized, sieved to obtain powders of 50–200 mesh, treated with HCl and HF, and formed into a crucible of 16-inch outer diameter (406 mmφ) after being melted by an arc flame of a revolving melting apparatus. This crucible shall be referred to as Crucible A.

Comparative Example 1

By way of comparison, Crucible B was made from natural quartz in accordance with the method disclosed in Example 1 of the aforementioned Japanese Provisional Patent Publication (Kokai) No. 60-137892. In particular, the natural quartz was pulverized, sieved to obtain powders of 50–80 mesh, and refined by flotation method. The refined powder was molded into the Crucible B by arc revolving melting. This crucible was heated to 1300° C. in a furnace, and a direct current at 10 kV was conducted vertically through the crucible for five minutes to thereby effect electrolysis and removal of alkali metals and copper.

Comparative Example 2

Crucible C was made from quartz powder in accordance with the Example 1 of the aforementioned Japanese Provisional Patent Publication (Kokai) No. 61-44793. In particular, powder of natural quartz of 50 to 100 mesh was poured in a rotating carbon die, and then powder of synthetic silica glass of 50 to 100 mesh was poured in the same carbon die. The powders were melted and casted with arc flame to form Crucible C.

Crucible A was placed in a silicon single crystal ingot pulling apparatus, and 60 kg of polycrystal silicon was charged in the crucible and melted. A predetermined amount of P-containing polycrystal silicon and B-containing polycrystal silicon was added as a doping material to the melt. A 5-inch silicon single crystal ingot was raised from the melt. The same experiment was conducted with respect to Crucibles B and C.

It was observed that in the cases of Crucibles A and C, it was possible to raise 90 cm of the ingot, but in the case of Crucible C, 40 cm was barely raised. The chemical analysis of the crucibles as well as their viscosities at 1400° C. and the OH group contents are shown in Table 1. The uniformity in specific resistance in the axial direction of the B- and P-doped ingots and the uniformity in specific resistance throughout the surface of the wafer sliced from the B- and P-doped ingots are entered in Table 2. The ingot raised from the Crucible A showed the best results in either table.

Examples 2-5 and Comparative Example 3-9

In a 500-liter glass-lined reactor, 130 liters of semiconductor-grade aqueous ammonia and 30 liters of super pure water were poured and cooled to 0° C., and the mixture was stirred with a Teflon-coated stirrer as 265 kg of methylsilicate (distilled) was dripped in the mixture. When the dripping was over, the resulting substance was dried by the centrifugal dehydrator whereby a 105 kg of sol silica powder was obtained.

The sol silica powder was dried at 150° C. in nitrogen gas to turn into gel silica powder, which was then packed in a quartz furnace tube. An oxygen gas stream was passed through the gel silica powder as the temperature was raised from room temperature to 1200° C. The residual 25 kg was packed in a high purity graphite case, and heated from room temperature to 1500° C. for two hours in vacuum, and then sintered by raising the temperature from 1500° C. to 1850° C. which took ten hours.

Next, the sintered body was pulverized and sieved to obtain a powder of 50-80 mesh, which was washed with HCl and HF. After drying, the powder was classified by means of a magnetic separator into four samples in shaped into crucibles. Table 3 shows the results of the analyses of the respective crucibles which include OH group content, the viscosity at 1400° C., and the expansion ratio of the crucible fragment when they were heated at 1500° C. for four hours under a pressure of $10^{-2}$ torr.

The synthesized silica glass crucibles of Examples 2-5 had relatively higher viscosity at 1400° C., so that it can provide a favorable situation for pulling up a high quality silicon semiconductor ingot. The impurities in the Example 2 crucible were as follows (ppm):

| Al | Fe | Na | K | Li | Ca | Ti | B | P | As |
|---|---|---|---|---|---|---|---|---|---|
| 0.03 | 0.15 | 0.09 | 0.10 | 0.008 | 0.09 | 0.010 | 0.09 | 0.003 | 0.003 |

As these crucibles are made by the sol-gel method, their manufacture is economical as well as simple.

In comparison, crucibles were made in the same method as in Examples 2-5, except that in place of 130 liters of the aqueous ammonia, an equal amount of 0.1N hydrochloric acid was used. The adsorbed moisture was from 0.062 to 0.22 weight percent. The result of its analysis is given in Table 3.

TABLE 1

| | CHEMICAL ANALYSIS *1 (ppm) | | | | | | | | | | VISCOSITY (poise) at 1400° C. *2 | OH content (ppm) |
|---|---|---|---|---|---|---|---|---|---|---|---|---|
| | Al | Fe | Na | K | Li | Ca | Ti | B | P | As | | |
| Example 1 | 0.30 | 0.15 | 0.09 | 0.10 | 0.005 | 0.09 | 0.009 | 0.005 | 0.003 | 0.003 | $3.5 \times 10^{10}$ | 10 |
| Comparative Example 1 | 12.00 | 0.60 | 0.20 | 0.15 | 0.005 | 0.35 | 3.50 | 0.035 | 0.010 | 0.009 | $4.0 \times 10^{10}$ | 100 |
| Comparative Example 2 | 0.08 | 0.09 | 0.03 | 0.04 | 0.005 | 0.035 | 0.003 | 0.005 | 0.003 | 0.003 | $9.5 \times 10^{8}$ | 350 |

*1: Zeeman atomic absorption photometer was used to analyze Al, Fe, Na, K, Li, Ca, and Ti.
*2: Fiber elongation method was used for the measurement.

TABLE 2

| | B - doped *3 | | P - doped *4 | |
|---|---|---|---|---|
| | uniformity in specific resistance in axial direction | uniformity in specific resistance throughout wafer surface | uniformity in specific resistance in axial direction | uniformity in specific resistance throughout wafer surface |
| Example 1 | ±7% | ±3 | ±25% | ±4 |
| Comparative Example 1 | ±18% | ±5 | ±60% | ±5 |
| Comparative Example 2 | ±10% | ±4 | ±45% | ±4 |

*3 Standard value was 100 Ω · cm
*4 Standard value was 40 Ω · cm

TABLE 3

| | EXAMPLES | | | | COMPARATIVE EXAMPLES | | | | | | |
|---|---|---|---|---|---|---|---|---|---|---|---|
| | 2 | 3 | 4 | 5 | 3 | 4 | 5 | 6 | 7 | 8 | 9 |
| water adsorbed to synthetic silica glass powder (wt %) | 0.005 | 0.022 | 0.031 | 0.042 | 0.062 | 0.080 | 0.112 | 0.136 | 0.170 | 0.200 | 0.220 |
| content of OH group in crucible (ppm) | 20 | 70 | 100 | 170 | 350 | 470 | 700 | 820 | 910 | 970 | 1000 |
| viscosity of crucible at 1400° C. (poise) | $5.62 \times 10^{10}$ | $5.01 \times 10^{10}$ | $3.16 \times 10^{10}$ | $2.00 \times 10^{10}$ | $1.88 \times 10^{10}$ | $1.50 \times 10^{10}$ | $1.44 \times 10^{10}$ | $1.32 \times 10^{10}$ | $1.06 \times 10^{10}$ | $1.00 \times 10^{10}$ | $1.00 \times 10^{10}$ |
| expansion coefficient of crucible (time) | 1.02 | 1.03 | 1.05 | 1.03 | 1.12 | 1.14 | 1.18 | 1.20 | 1.22 | 1.24 | 1.25 | which the respective amounts of the adsorbed moisture were from 0.005 to 0.042 weight percent as shown in Table 3. These samples were melted by arc flame, and

What is claimed is:

1. A glass article consisting essentially of a synthetic silica glass having a viscosity of not lower than $10^{10}$ poise at 1400° C., and an impurity content within the following ranges:

Al, no more than 1 ppm;
Fe, no more than 0.2 ppm;
Na, no more than 0.2 ppm;
K, no more than 0.2 ppm;
Li, no more than 0.01 ppm;
Ca, no more than 0.2 ppm;
Ti, no more than 0.02 ppm;
B, no more than 0.01 ppm;
P, no more than 0.01 ppm; and
As, no more than 0.01 ppm.

2. The synthetic silica glass article of claim 1 wherein the content of OH group is not greater than 300 ppm.

3. A glass consisting essentially of a synthetic silica glass having a viscosity of not lower than $10^{10}$ poise at 1400° C., and an impurity content within the following ranges:

Al, no more than 1 ppm;
Fe, no more than 0.2 ppm;
Na, no more than 0.2 ppm;
K, no more than 0.2 ppm;
Li, no more than 0.01 ppm;
Ca, no more than 0.2 ppm;
Ti, no more than 0.02 ppm;
B, no more than 0.01 ppm;
P, no more than 0.01 ppm; and
As, no more than 0.01 ppm.

4. The synthetic silica glass of claim 3 wherein the OH group content is not greater than 300 ppm.

5. The synthetic silica glass of claim 3 wherein the OH group content is not greater than 200 ppm.

* * * * *